(12) United States Patent
Whistler (10) Patent No.: US 8,249,517 B1
(45) Date of Patent: Aug. 21, 2012

(54) VISUALIZING RADIO FREQUENCY ENVIRONMENT AROUND AN OBSERVATION SITE

(75) Inventor: Kenneth P. Whistler, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 724 days.

(21) Appl. No.: 12/368,007

(22) Filed: Feb. 9, 2009

(51) Int. Cl.
*H04B 17/00* (2006.01)

(52) U.S. Cl. .................. 455/67.14; 455/154.2; 455/301

(58) Field of Classification Search ............... 455/67.14, 455/154.2, 301
See application file for complete search history.

(56) References Cited

U.S. PATENT DOCUMENTS

| | | | |
|---|---|---|---|
| 7,171,193 B2 * | 1/2007 | Hoffman | 455/417 |
| 2005/0186913 A1 * | 8/2005 | Varanda | 455/67.11 |

* cited by examiner

*Primary Examiner* — John Poos (57) ABSTRACT

A system for visualizing a Radio Frequency ("RF") environment around an observation site includes a receiver, a scanner, a detector, and a display. The receiver includes an antenna and a shield shielding the antenna to create a directional signal reception path to enable reception of RF signals at known orientations. The scanner is coupled to the receiver and is configured to rotate the shield to modify the directional signal reception path of the receiver. The detector is coupled to the receiver and the scanner, and the detector is configured to receive the RF signals from the receiver along with their associative orientation information and to detect an intensity of the received RF signals. The display is coupled to the detector and is configured to generate a display responsive to the received RF signals from the receiver, including their associative orientation information and intensity.

32 Claims, 9 Drawing Sheets

VISUALIZING RADIO FREQUENCY ENVIRONMENT AROUND AN OBSERVATION SITE

TECHNICAL FIELD

This disclosure relates to visualizing radio frequency ("RF") environment around an observation site.

BACKGROUND

Prior to the installation of a cell tower for a mobile communication network, a candidate location must be characterized as to its suitability as a transmission site and a reception site. Current methodology consists of placing a directional antenna at the candidate location and then measuring the signal transmitted from the antenna at various locations around the candidate site. The elevation, azimuth, and amplitude of the candidate site coverage are computed from the geographic locations and signal strength measurements taken in the field.

Candidate cell sites are also characterized by the existing RF environment or interference at the site. Current methodology is to take measurements at the frequency and bandwidth of interest from the cell antennas installed at the completed site. Since the cell site antennas are mounted in fixed orientations, the originating direction of any resulting signals can only be known to a gross bearing. For example, if there are 3 directional cell antennas mounted at compass bearing 0, 120, and 240 degrees from North, then an offending signal received by one of these antennas can be thought of as coming from one of those bearings. If further clarification is needed, the antenna with the strongest offending signal level could be rotated until the signal level is measured to be at a maximum. Then, the compass bearing to the source of the signal can be determined. One of the disadvantages of this method is the possibility of detecting a peak signal level in a side-lobe of the directional antenna instead of in the main lobe, thus leading to a false directional reading.

Similarly the antenna angle with respect to the horizon could be adjusted to find the maximum value and the elevation (or declination) of the offending signal. The signal measurement device is typically a level meter or a spectrum analyzer that indicates the amplitude of the signal. It does not have a display which incorporates azimuth and elevation information from the orientation of the antenna.

Accordingly, there is a need for a system for quickly displaying not only the amplitude of the signal but also azimuth and elevation of the signal.

SUMMARY

In one general aspect, the instant application describes a system for visualizing a Radio Frequency ("RF") environment around an observation site. The system includes a receiver, a scanner, a detector, and a display. The receiver includes an antenna and a shield shielding the antenna to create a directional signal reception path to enable reception of RF signals at known orientations. The scanner is coupled to the receiver and is configured to rotate the shield to modify the directional signal reception path of the receiver. The detector is coupled to the receiver and the scanner, and the detector is configured to receive the RF signals from the receiver along with their associative orientation information and to detect an intensity of the received RF signals. The display is coupled to the detector and is configured to generate a display responsive to the received RF signals from the receiver, including their associative orientation information and intensity.

Implementations of the above general aspect may include one or more of the following features. The shield may surround the antenna to only allow RF signals from a small vertical and horizontal segment for a given orientation of the shield. The shield may be configured to form a traveling aperture around the antenna and block the RF signals except for those received through the traveling aperture. The scanner may rotate and elevate the traveling aperture with respect to the antenna. The scanner may report the rotation and elevation of the traveling aperture to the detector as the associative orientation inform of the received RF signals.

In one implementation, the shield may include a plurality of tubes. The plurality of tubes may include a first tube having a radial slit running the length of the tube, allowing the antenna to receive RF signals only along the radial slit. Additionally, the plurality of tubes may include a second tube covering the first tube and having a spiral slit running along the whole length of the second tube. When the slits of the first tube and the second tube coincide with each other they may create an aperture and may block RF signals except for those received through the aperture. When the second tube is rotated when the first tube is motionless, the aperture travels vertically. When the first tube is rotated when the second tube is motionless, the aperture travels vertically and horizontally.

The plurality of tubes may also include a third tube having a horizontal slit running around the tube. When the slit of the third tube coincides with those of the first and second tubes, it may create a waveguide that emphasizes the detection of the angle of the received RF signals.

The antenna may include an Omni-directional antenna. The display may include a heads-up display. The display may be synchronized with the orientation of the traveling aperture so that a viewing operator can view the RF signals in the direction of view. The display may represent an air space around the antenna, displaying the RF signals in their airspace locations.

The display may include a vertical strip of light-emitting diode that is rotated in a plane corresponding to the compass orientation. The distance along the radius of the rotation may correspond to elevation, and the brightness of the light-emitting diode indicates signal's strength. The display may include a vertical light-emitting diode strip rotated about the head of an observer so that the observer sees the signal strength in the direction being viewed. As the head of the observer rotates, the signal strength may change according to the direction of the viewing sight. The display may display the associative orientation and intensity of the received RF signals by a tubular form of an electronic display screen. The electronic display screen may include an LCD computer screen used in an overhead projector display panel. The associative orientation information may include elevation and azimuth.

The observation site may be a cell tower of a mobile communication network.

In another general aspect, the instant application includes an alternative system for visualizing a Radio Frequency ("RF") environment around an observation site. The system includes a receiver including an antenna coupled to an observer and configured to receive RF signals in the direction of the observer's view. A detector is coupled to the receiver and configured to receive the RF signals from the receiver and to detect an intensity of the received RF signals. A display coupled to the detector is configured to display the intensity of the RF signal in the direction of observer's view.

The display may be a heads-up display. The display may be synchronized with the orientation of the observer so that display shows the intensity of the RF signal in the observer's direction of view. The display may include a vertical light-emitting diode strip rotated about the head of the observer so that the observer sees the signal strength in the direction being viewed. As the head of the observer rotates, the signal strength may change according to the direction of the viewing sight. The display may display the intensity of the RF signal on an LCD computer screen used in an overhead projector display panel. The antenna may be surrounded by a shield configured to only allow RF signals to reach the antenna from an aperture aligned with the observer's direction of view.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DETAILED DESCRIPTION

In the following detailed description, numerous specific details are set forth by way of examples in order to provide a thorough understanding of the relevant teachings. However, present teachings may be practiced without such details. In other instances, well-known methods, procedures, components, and circuitry have been described at a relatively high-level, without detail, in order to avoid unnecessarily obscuring aspects of the present teachings.

In one implementation, the instant application provides a way to visualize the RF environment surrounding an observation site such as a site or possible site of a cell tower. The idea is to give an operator a way to 'see' the RF environment surrounding a reception point by collecting RF signal's azimuth and elevation as well as its amplitude. The azimuth and elevation information is used to drive a display such that the orientation of the RF signal environment is overlaid on a display of the physical environment. The effect would be to show an operator the location and signal characteristics as if he could view the RF signal directly.

In order to drive a display as a function of the azimuth and elevation of an RF signal of interest, a receiving antenna reports its azimuth and elevation. For example, a radar dish antenna such as used in air traffic control constantly rotates as it transmits and receives the radar signal. The rotation of the antenna is electronically coupled to the location of the signal displayed to the air traffic controllers. The display screen has an orientation to the physical world through compass orientation. The conventional orientation is that North is up, East is to the right, South is down and West is to the left. In other words, the display surface represents the airspace around the antenna and the lines and spots displayed represent the received signals of interest in their airspace location.

The physical location of the spots and lines upon the display correspond to the physical location of the received signals of interest in the airspace. Operators can imagine themselves at the center of the display and 'looking' around with the radar beam to see the location of aircraft. An operator can look out the window of the air traffic control tower in the compass direction indicated on the display screen and the physical world matches the representational world of the display. If the rotating radar display signal were to be projected onto the windows of the control tower so that the direction of the radar beam matched the compass direction of the windows, an operator could 'see' the surrounding airspace with the electronic signal overlaid on the physical world. The radar spots representing airplanes would display over the actual airplane as viewed by the operator.

Figure 1:
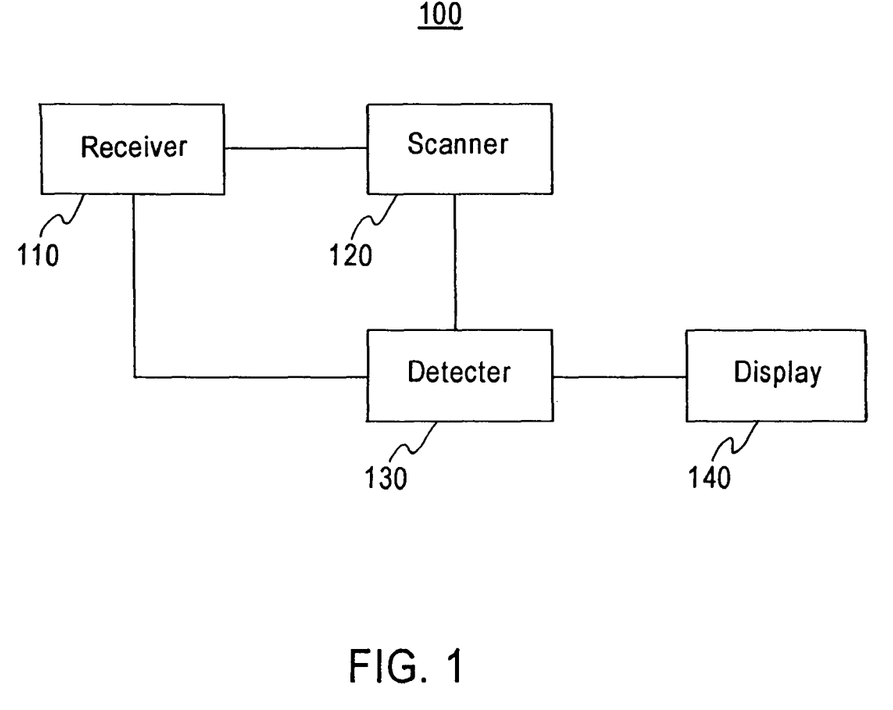
FIG. 1 illustrates an exemplary system for visualizing an RF signal surrounding an observation site.

FIG. 1 illustrates an exemplary system 100 for visualizing an RF signal surrounding an observation site. The system 100 includes a receiver 110, a scanner 120, a detector 130, and a display 140. The receiver is configured to receive RF signal present in the surrounding environment. To this end, the receiver 110 includes an antenna and a shield. The antenna in one example includes an Omni-directional antenna which is surrounded by the shield that creates a directional signal reception path, to enable selective reception of RF signals at known orientations. In particular, the shield surrounds the antenna to only allow RF signals from a small vertical and horizontal segment for a given orientation of the shield. For example and as further described with respect to FIGS. 2-4, the shield forms a traveling aperture around the antenna and blocks the RF signals except for those received through the traveling aperture.

The scanner 120 is coupled to the receiver 110 and configured to rotate the shield to modify the directional signal reception path of the receiver 110. The scanner 120 rotates and elevates the traveling aperture with respect to the antenna and reports the rotation and elevation of the traveling aperture to the detector 120.

The detector 130 is coupled to the receiver 110 and the scanner 120 and is configured to receive the amplitude of the received RF signals from the receiver 110 and their associative orientation information from the scanner 120. The associative orientation information includes, for example, the azimuth and the elevation of the traveling aperture. One reason for calling out a separate detector section in system 100 is that the detector 130 acts as a filter to allow only RF signals of interest through to the display section. For example, the detector 130 can be set to allow only signals of certain frequency through the display section 140. Alternatively or additionally, the detector 130 may be set to allow only signals of a certain modulation class, such as, for example, CDMA through to the display section 140.

The detector 130 can take several forms depending on the particular implementation. In one implementation, the detector 130 is a simple RF detection circuit whose output is a voltage proportional to the strength of the received signal of the frequency of interest. Alternatively or additionally, the detector 130 can take the form of a demodulation circuit whose output varies with the type or content of a signal modulated onto the RF signal. Alternatively or additionally, the detector 130 can take the form of a decoder whose output varies with the encoded specifics of the RF signals such as decoding CDMA signals over GSM signals. In yet another example, the detector 130 can take the form of a circuit whose output level depends on the information encoded into a specific modulation scheme such as the subscriber information or similar identifying characteristic of a mobile phone. Regardless of the particular form, the detector 130 produces an output signal that increases when the antenna aperture is pointing at the particular signal of interest.

If the RF signals in question were those from a CDMA mode phone on a certain carrier with a given unique serial number, the system could be used in search and rescue operations or to test the ability of a phone to transmit to the cell site or tower from a particular location. The idea is that the detector 130 can select one or more characteristics of the RF signal in order to increase the selectivity and discrimination of the system 100.

The display 140 is coupled to the detector 130 and is configured to generate a display responsive to the received RF signals from the receiver, including their associative orientation information and intensity. In one implementation, the display includes a heads-up display. That is, the display is synchronized with the orientation of the traveling aperture so that a viewing operator can view the RF signals in the direction of view. In another implementation, the display may take the form of a synchronized mechanical display that the user can view from indoor. For example, the display may take the form of an X-Y-Z (for azimuth, elevation, and intensity) display on a conventional computer display screen. The position information may be digitized and stored for integration into a display of reception at multiple frequencies, modulation or some other characteristic of the detected RF signals. Examples of the outputs via the display 140 are described in more detail with respect to FIGS. 7-8.

As noted above, the receiver includes an antenna covered by a shield. The shield includes a plurality of tubes surrounding a central vertical antenna. The first tube (or the innermost tube) is constructed of a solid material with high RF signal blocking characteristics. The first tube has a radial slit running the length of the tube so that the antenna mounted in the center is allowed to receive signals along its length in one orientation only. The first tube blocks signals to the ends of the antenna.

Figure 2A:
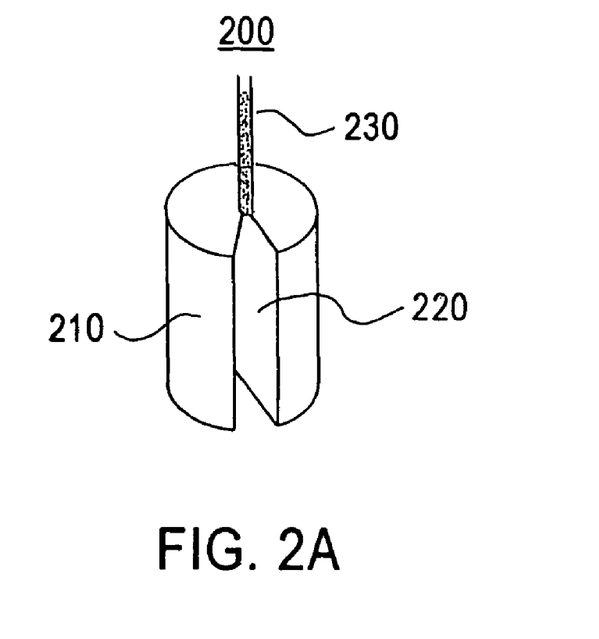
FIGS. 2A and 2B illustrate an exemplary structure of such a first tube of a shield around an antenna.
Figure 2B:
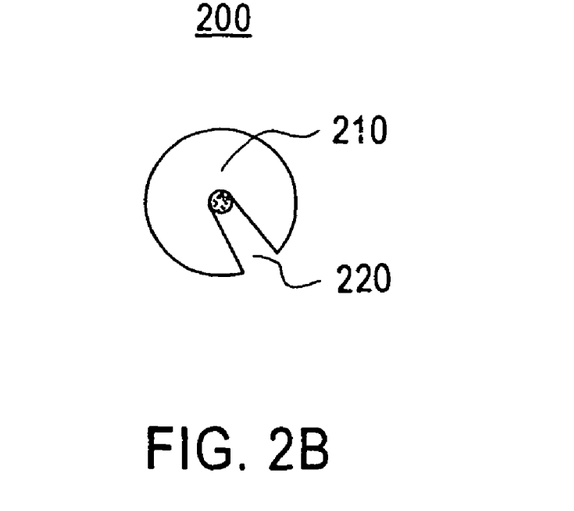

FIGS. 2A and 2B illustrate an exemplary structure of such a first tube 200. FIG. 2A illustrates a front view of the first tube, and FIG. 2B illustrates a top view of the first tube 200. As shown, the first tube 200 includes a body 210 covering antenna 230 and a radial slit 220 running the length of the body 210. The body 210 is made of a solid material but for the radial slit 220. The solid material has high RF signal blocking characteristics and only allows the antenna 230 to receive RF signals along the radial slit 220. In another implementation, the body 210 includes a hollow interior. In this implementation, the exterior of the body 210, however, is made of a solid material having RF signals blocking characteristics and includes the radial slit 220. In the illustrated orientation, the antenna 230 is vertical and the radial slit 220 runs along the vertical length of the first tube 200. The radius of the first tube 200 may be chosen so that it is not related to a resonant wavelength of the desired signal. The idea is to form a signal-blocking cavity that only allows signals through to the antenna 230 when the radial slit 220 is in the radial direction of the signal source.

Figure 3:
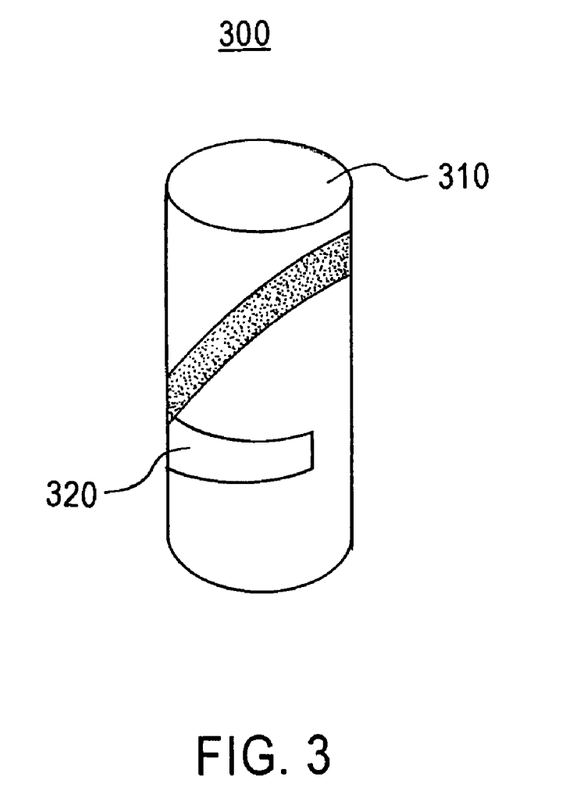
FIG. 3 illustrates an exemplary structure of a second tube of the shield arrangement.

The second tube is also made of RF signals blocking material. It has a cut in a spiral such that one turn of the spiral runs along the whole length of the tube. The second tube looks like a one-striped barber pole. FIG. 3 illustrates an exemplary structure of a second tube 300. The second tube 300 is situated outside of the first tube 200 and covers the first tube 200. The second tube 300 includes a body 310 and a spiral slit 320, which runs along the whole length of body 310. The body 310 includes a hollow interior, enabling it to fit around the first tube 200. The exterior of the body 310, however, is made of a solid material having RF signals blocking characteristics and includes the spiral slit 320. The wall thickness of the second tube 300 should be chosen for physical stiffness and, such that, it does not increase the depth of the radial slit 220 to a point where it forms a cavity resonant with the signal of interest.

Figure 4:
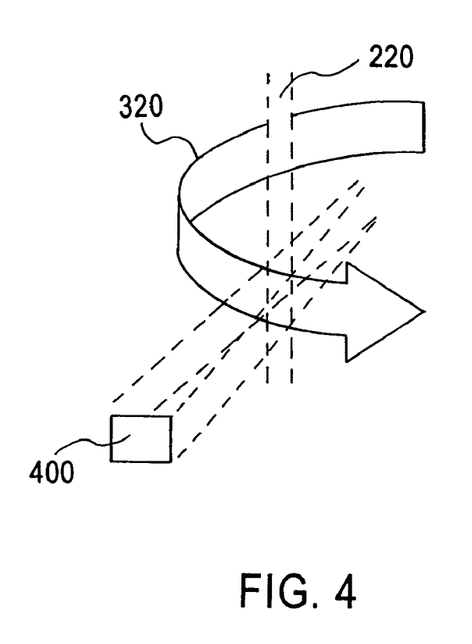
FIG. 4 illustrates an exemplary structure of an aperture.

When the first and second tubes 200, 300 are mounted concentrically, the effect is to create an aperture where the slits on the tubes coincide. FIG. 4 illustrates an exemplary structure of such an aperture 400. The aperture 400 illustrates a coincident point of a vertical radial slit 220 and a spiral slit 320. Only the RF signals passing through the aperture 400 are allowed to reach the antenna 230. When the second tube 300 is rotated while the first tube 200 is stationary, the result is a moving aperture that travels vertically. When the first tube 200 is rotated so that it sweeps the proportion of its slit width to 360 degrees for every turn of the second tube 300, the effect is a moving aperture that sweeps vertically and while covering 360 degrees around the axis of rotation.

For example, if the angular slit width in the center tube is 10 degrees, the ratio of outer rotation to inner rotation is 36. That is, the second tube 300 rotates 36 times for the first tube 200 to rotate once. This has the effect of allowing signals to reach the antenna inside from a known direction in azimuth and elevation, based on the knowledge of the current points in the respective rotations of tubes 200 and 300. In a similar fashion, the ratio of rotation of the tubes 200, 300 could be manipulated so that horizontal scans in 360 degrees could be taken and then the scan aperture indexes vertically.

Figure 5:
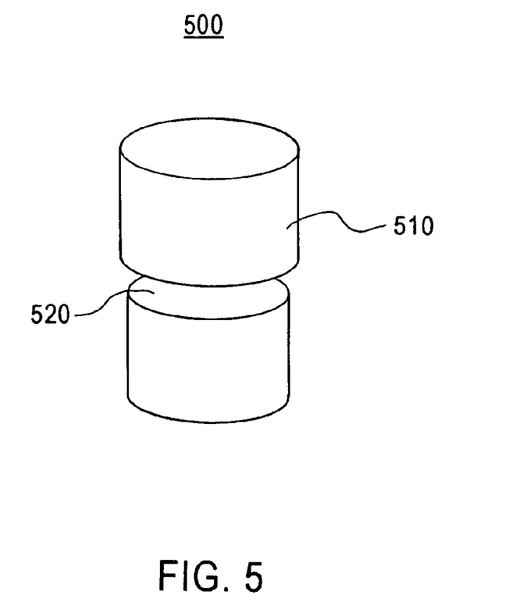
FIG. 5 illustrates an exemplary structure of a third tube of a shield arrangement.

Since radio waves travel in a straight line, they appear to be parallel when the distance from the source to the detector is great. This is similar to the parallax effect of starlight from celestial objects. In order to obtain more information about directionality of incoming RF signals a third tube coincident to the first two may be employed to create a waveguide that emphasizes the detection of the angle of signals. The third tube is also an RF shield having a horizontal slit located halfway up the side and going entirely around the tube.

FIG. 5 illustrates an exemplary structure of a third tube 500. The third tube 500 includes a body 510 and a horizontal slit 520. The horizontal slit 520, in one implementation, is located halfway up the side and runs entirely around the third tube 500. The third tube 500 is the outermost tube and covers the first and second tubes 200, 300. The radius of the third tube 300 is proportional to the wavelength RF signals of the desired frequency of the antenna and the detector. The wall thickness of the third tube 500 is chosen for physical thickness. The radial distance between the outer wall of the third tube 500 and the antenna 230 at the center of the first tube 200 is chosen to be related to a resonant wavelength of the desired signal. The aperture 400 makes a tuned cavity when it is positioned inside the third tube 500.

The effect of the third tube 500 is to favor desired signals when the distance between the outer surface of the third tube 500 and the preceding two tubes 200, 300 is close to the wavelength of the desired signal. Since the angle from horizontal between the fixed slit 520 of the third tube 500 and the vertical location of the moving aperture 400 formed by the first two tubes 200, 300 is known, and the distance between them act as a resonance filter for the frequency under investigation, the strength of desired signals in azimuth and elevation can be measured as a function of rotation of the first two tubes 200, 300.

Figure 6:
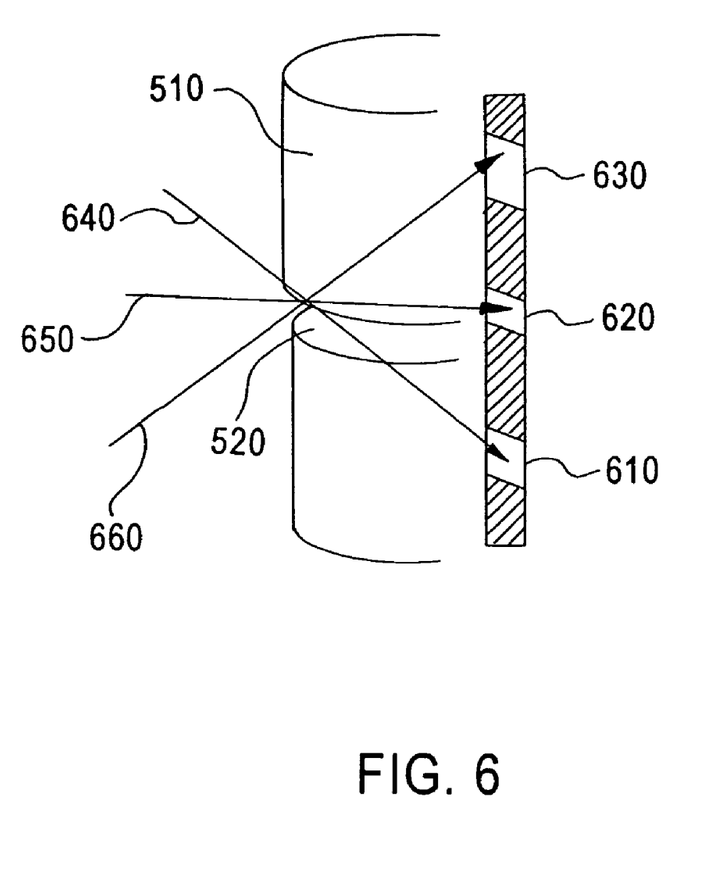
FIG. 6 illustrates three exemplary RF signals that may be emphasized depending on the position of a traveling aperture with respect to a horizontal slit of the third tube illustrated in FIG. 5.

FIG. 6 illustrates three exemplary RF signals that may be emphasized depending on the position of the traveling aperture 400 with respect to the horizontal slit 520 of the third tube 500. As the aperture travels vertically, the horizontal slit 520 favors signals traveling upwardly with respect to the third tube 500. To illustrate, when the traveling aperture 400 is at position 610, the horizontal slit 520 favors RF signal 640. Alternatively, when the traveling aperture 400 is at position 620, the horizontal slit 520 favors RF signal 650, and when the traveling aperture 400 is at position 630, the horizontal slit 520 favors the RF signal 660.

Figure 7:
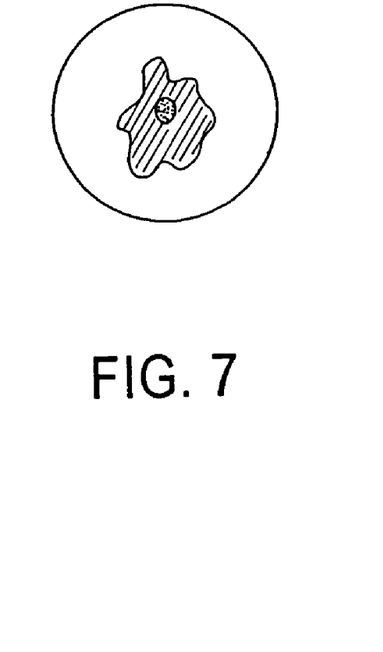
FIG. 7 illustrates an exemplary display showing the amplitude of received signals as function of distance from a central point on a display screen.

The amplitude, elevation, and azimuth of signals may be displayed in a fashion that reproduces the orientation of the original source relative to the observation site. That is, the amplitude, elevation, and azimuth may be displayed in real time in a fashion that would orient a viewer to a source of the signal. The effect enables the viewer to see radio waves. For example, the operator will be able to virtually "see" radio waves surrounding a cell site. One method is to display the amplitude of the received signal as a function of distance from a central point on a display screen. The angular relationship may be displayed as a function of rotation of the amplitude vector about the central point. The effect is similar to a vectorscope display. FIG. 7 illustrates such an exemplary display.

Figure 8:
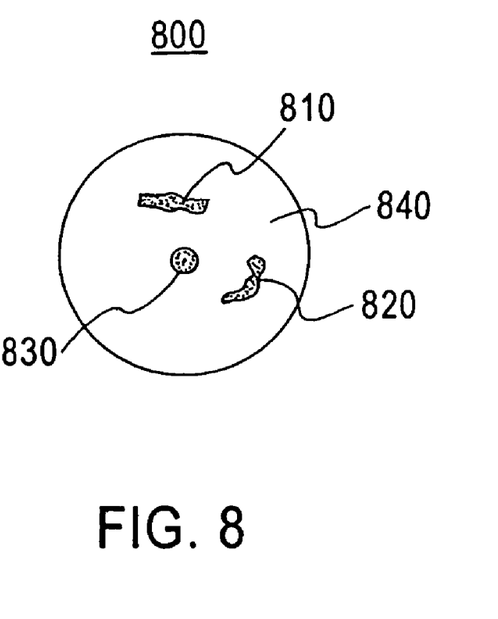
FIG. 8 illustrates an exemplary display in which the RF signal is represented by whirling discs with spots corresponding to orientation of the RF signal.

A variation on this is to represent the bearing as a function of rotation of the amplitude vector about the central point as before, however, the elevation of the received signal is represented as a function of distance from the central display point, and the amplitude of the received signal is represented by the brightness of the display. FIG. 8 illustrates an exemplary display 800 in which the RF signal is represented by a whirling discs with spots corresponding to orientation of the RF signal. When the rotation of the traveling aperture (and the corresponding light-emitting diode strip) is fast enough to take advantage of the persistence of vision effect, the result is a whirling disc 810, 820 with bright bands, stripes, or spots corresponding to the orientation of the RF signal received through the traveling aperture. The conventional orientation of plane 840 is that north is up, east is to the right, south is down, and west is to the left. Here, the whirling disc 810 illustrates an RF signal facing the north side of the central display point 830. The whirling disc 820 illustrates an RF signal facing the east side of the central display point 830. In one implementation, the elevation of the displayed RF signal is represented as a function of distance of the whirling disc 810, 820 from the central display point 830. The amplitude of the displayed RF signals is represented by the brightness of spots comprising the whirling disc 810, 820.

The brightness effect caused on the display may be caused by a plurality of light emitting diodes ("LEDs"). To illustrate, referring to FIG. 9, a ten-segment LED strip 910 is connected to a voltage reference 920 and current divider circuit such that an increase in received signal level causes additional adjacent LEDs on the strip to illuminate. For example, when the received signal level is at $\frac{1}{10}^{th}$ of the maximum, one LED segment on the end of the strip is illuminated. As the received signal level increases another $\frac{1}{10}^{th}$ of its range, an LED segment adjacent to the first one also illuminates. As the received signal level increases, additional adjacent LEDs illuminate until the 100% signal level illuminates all the LEDs in the strip. The effect is like a thermometer or bar graph display of the corresponding received signal level.

Figure 9:
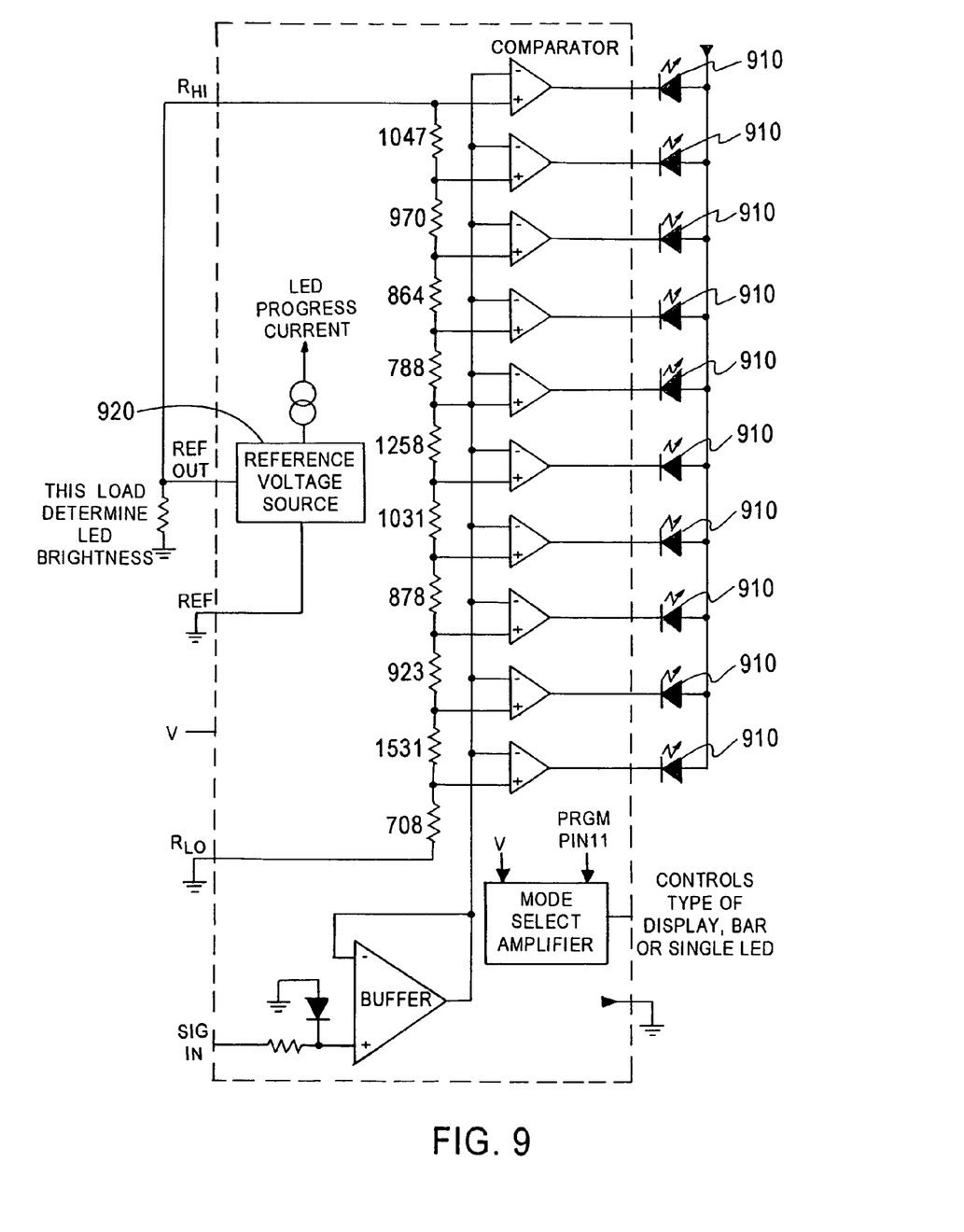
FIG. 9 illustrates an exemplary LED circuit used to represent the RF signal.

The LED strip is rotated so that the light segments form a plane of rotation. The segment of the strip corresponding to the lowest signal level is at the center of rotation. If the rotation occurs faster than the human eye can follow, persistence of vision will create the effect of an illuminated disc. If the signal to the LED strip varies as a function of rotation, the illuminated disc will appear to change radius. For low level signals, only a few segments will display near the center of the illuminated disc. As the signal increases to the maximum level, the illuminated disc appears to increase its radius. Alternatively, the output signal of the circuit could be arranged so that only one LED segment corresponding to the level of the received signal illuminates. In this case, the rotated display will take the form of a ring whose radius changes with the received signal level.

A rotational speed of thirty (30) revolutions per second is sufficient to sustain the persistence of vision effect. By coordinating the rotation of the illuminated disc with the rotation of the traveling aperture the strength of received signal for a given bearing will change the diameter of the illuminated disc along the same bearing. For example, if the illuminated disc is oriented so that straight up is understood to be north, when the traveling aperture receives a signal from the north the display will appear to bulge in the top or 'northern' section.

Other implementations are contemplated. A variation on the above-described displays is to have the vertical light-emitting diodes strip rotate about the head of the observer so that the observer sees the RF signal strength in the viewing direction. Since the bearing and elevation of the aperture would match the location of the light-emitting diode being illuminated at a matching point in the rotation, the effect would be like standing in the center of a vertically oriented transparent tube and seeing the signal strength displayed on the walls of the tube in the direction of the actual signal. As the observer rotates, the signal strength view changes according the direction of sight.

Figure 10:
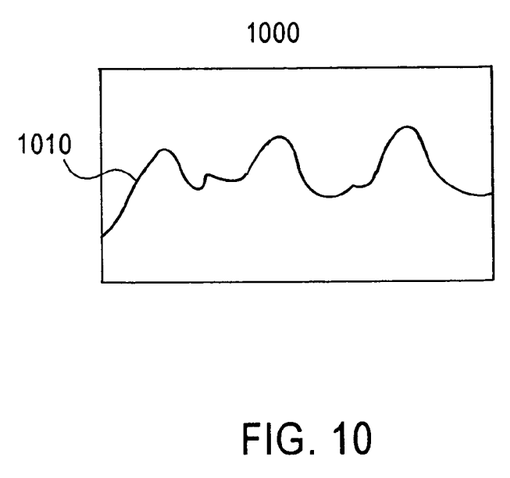
FIG. 10 illustrates an exemplary heads-up display in which a viewer can view the RF signal in the viewing direction.

FIG. 10 illustrates an exemplary heads-up display 1000 in which a viewer can view the RF signal in the viewing direction. The RF signal 1000 is presented by amplitude 1010 which is displayed on a tubular form of an electronic display screen. The tubular form of an electronic display screen may include an LCD computer screen used in an overhead projector display panel. To implement such a display, in one implementation, the system includes a receiver including an antenna coupled to an observer and configured to receive RF signals in the direction of the observer's view. For example, rather than periodically scanning the moving aperture, the scanning circuit would position the aperture to observe and receive RF signals from the direction corresponding to the observer's direction of view. A detector is coupled to the receiver and configured to receive the RF signals from the receiver and to detect an intensity of the received RF signals; and a display coupled to the detector is configured to display the intensity of the RF signal in the direction of observer's view.

The antenna may be surrounded by a shield configured to only allow RF signals to reach the antenna from an aperture aligned with the observer's direction of view. The detector receives the intensity of the RF signal received through the aperture and reports it to the display, which displays it on a display screen. In one example, the display includes a heads-up display, which is synchronized with the orientation of the observer so that display shows the intensity of the RF signal in the observer's direction of view.

Other implementations are contemplated.

What is claimed is:

1. A system for visualizing a Radio Frequency ("RF") environment around an observation site, the system comprising:
   a receiver including an antenna and a shield shielding the antenna to create a directional signal reception path to enable reception of RF signals at known orientations;
   a scanner coupled to the receiver and configured to rotate the shield to modify the directional signal reception path of the receiver;
   a detector coupled to the receiver and the scanner, the detector configured to receive the RF signals from the receiver along with their associative orientation information and to detect an intensity of the received RF signals; and
   a display coupled to the detector and configured to generate a display responsive to the received RF signals from the receiver, including their associative orientation information and intensity.

2. The system of claim 1, wherein the shield surrounds the antenna to only allow RF signals from a small vertical and horizontal segment for a given orientation of the shield.

3. The system of claim 1, wherein the shield is configured to form a traveling aperture around the antenna and block the RF signals except for those received through the traveling aperture.

4. The system of claim 3, wherein the display is synchronized with the orientation of the traveling aperture so that a viewing operator can view the RF signals in the direction of view.

5. The system of claim 3, wherein the scanner rotates and elevates the traveling aperture with respect to the antenna.

6. The system of claim 1, wherein the scanner reports the rotation and elevation of the traveling aperture to the detector as the associative orientation information of the received RF signals.

7. The system of claim 1, wherein the shield includes a plurality of tubes.

8. The system of claim 7, wherein the plurality of tubes includes a first tube having a radial slit running the length of the tube, allowing the antenna to receive RF signals only along the radial slit.

9. The system of claim 8, wherein the plurality of tubes includes a second tube covering the first tube and having a spiral slit running along the whole length of the second tube.

10. The system of claim 9, wherein when the slits of the first tube and the second tube coincide with each other they create an aperture and block the RF signals except for those received through the aperture.

11. The system of claim 10, wherein when the second tube is rotated when the first tube is motionless, the aperture travels vertically.

12. The system of claim 10, wherein when the first tube is rotated when the second tube is motionless, the aperture travels vertically and horizontally.

13. The system of claim 9, wherein the plurality of tubes includes a third tube having a horizontal slit running around the tube.

14. The system of claim 13, wherein when the slit of the third tube coincides with the slits of the first and second tubes, it creates a waveguide that emphasizes the detection of the angle of the received RF signals.

15. The system of claim 1, wherein the antenna includes an Omni-directional antenna.

16. The system of claim 1, wherein the display includes a heads-up display.

17. The system of claim 1, wherein the display represents an air space around the antenna, displaying the RF signals in their airspace locations.

18. The system of claim 1, wherein the display includes a vertical strip of light-emitting diode that is rotated in a plane corresponding to the compass orientation.

19. The system of claim 18, wherein the distance along the radius of the rotation corresponds to elevation, and the brightness of the light-emitting diode indicates signal's strength.

20. The system of claim 1, wherein the display includes a vertical light-emitting diode strip rotated about the head of an observer so that the observer sees the signal strength in the direction being viewed.

21. The system of claim 20, wherein as the head of the observer rotates, the signal strength changes according to the direction of the viewing sight.

22. The system of claim 1, wherein the display displays the associative orientation and intensity of the received RF signals by a tubular form of an electronic display screen.

23. The system of claim 22, wherein the electronic display screen includes an LCD computer screen used in an overhead projector display panel.

24. The system of claim 1, wherein the associative orientation information includes elevation and azimuth.

25. The system of claim 1, wherein the observation site includes a cell tower of a mobile communication network.

26. A system for visualizing a Radio Frequency ("RF") environment around an observation site, the system comprising:
   a receiver including an antenna configured to receive RF signals in the direction of an observer's view;
   a detector coupled to the receiver and configured to receive the RF signals from the receiver and to detect an intensity of the received RF signals; and
   a display coupled to the detector and configured to display the intensity of the RF signal in association with the direction of the observer's view.

27. The system of claim 26, wherein the display includes a heads-up display.

28. The system of claim 26, wherein the display is synchronized with the orientation of the observer so that display shows the intensity of the RF signal in the observer's direction of view.

29. The system of claim 26, wherein the display includes a vertical light-emitting diode strip rotated about the head of the observer so that the observer sees the signal strength in the direction being viewed.

30. The system of claim 29, wherein as the head of the observer rotates, the signal strength changes according to the direction of the viewing sight.

31. The system of claim 26, wherein the display displays the intensity of the RF signal on an LCD computer screen used in an overhead projector display panel.

32. The system of claim 26, wherein the antenna is surround by a shield configured to only allow RF signals to reach the antenna from an aperture aligned with the observer's direction of view.

* * * * *